(12) United States Patent
Kamiyama et al.

(10) Patent No.: US 7,398,797 B2
(45) Date of Patent: Jul. 15, 2008

(54) PIPE LINING METHOD

(75) Inventors: Takao Kamiyama, Hiratsuka (JP); Koji Kaneta, Hiratsuka (JP); Kenji Fujii, Hiratsuka (JP)

(73) Assignee: Shonan Gosei-Jushi Seisakusho K.K. (JP)

( * ) Notice: Subject to any disclaimer, the term of this patent is extended or adjusted under 35 U.S.C. 154(b) by 0 days.

(21) Appl. No.: 11/786,709

(22) Filed: Apr. 12, 2007

(65) Prior Publication Data

US 2007/0240779 A1    Oct. 18, 2007

(30) Foreign Application Priority Data

Apr. 14, 2006    (JP) .............................. 2006-111526

(51) Int. Cl.
*F16L 55/16*    (2006.01)

(52) U.S. Cl. .......................... 138/98; 138/97; 156/287; 156/156; 156/293; 264/267; 264/269; 264/36; 405/150.1; 405/184.2; 405/184.5

(58) Field of Classification Search ............... 138/97, 138/98; 405/184.1, 150.1, 184.2, 184.5; 264/267, 269, 516, 36; 156/287, 156, 293, 156/294; 219/535

See application file for complete search history.

(56) References Cited

U.S. PATENT DOCUMENTS

| | | | | |
|---|---|---|---|---|
| 4,714,095 A | * | 12/1987 | Muller et al. ............... | 138/98 |
| 4,894,521 A | * | 1/1990 | Evans ......................... | 219/535 |
| 5,223,189 A | * | 6/1993 | Friedrich ..................... | 264/31 |
| 5,356,502 A | * | 10/1994 | Kamiyama et al. .......... | 156/267 |
| 5,971,031 A | * | 10/1999 | Kamiyama et al. ........... | 138/98 |
| 6,006,787 A | * | 12/1999 | Kamiyama et al. ........... | 138/98 |
| 6,085,794 A | * | 7/2000 | Kamiyama et al. ........... | 138/98 |
| 6,103,052 A | * | 8/2000 | Kamiyama et al. .......... | 156/253 |
| 6,123,109 A | * | 9/2000 | Kamiyama et al. ........... | 138/98 |
| 6,206,049 B1 | * | 3/2001 | Ward ........................... | 138/98 |
| 6,651,699 B2 | * | 11/2003 | Kweon ........................ | 138/98 |
| 7,073,536 B2 | * | 7/2006 | Blackmore et al. ........... | 138/98 |
| 7,135,087 B2 | * | 11/2006 | Blackmore et al. .......... | 156/293 |
| 7,267,739 B2 | * | 9/2007 | Blackmore et al. .......... | 156/293 |

* cited by examiner

*Primary Examiner*—Patrick F Brinson
(74) *Attorney, Agent, or Firm*—Adams & Wilks (57) ABSTRACT

There is provided a pipe lining method wherein a lateral pipe lining material and a main pipe lining material are securely joined. After a lateral pipe has been lined, a start liner is applied to the main pipe and a main pipe lining material is then inserted. A heating wire for melting the start liner is mounted on a surface of a flange of the lateral pipe lining material during or after lining of the lateral pipe. While the main pipe is being lined, the heating wire is heated to melt the start liner existing between the flange of the lateral pipe lining material and the main pipe lining material. When the resin in the main pipe lining material is cured, the main pipe lining material and flange of the lateral pipe lining material are integrated. This allows the lateral pipe lining material and main pipe lining material to be reliably joined.

14 Claims, 7 Drawing Sheets

PIPE LINING METHOD

BACKGROUND OF THE INVENTION

1. Field of the Invention

The present invention relates to a pipe lining method, and more specifically relates to a pipe lining method in which, after a lateral pipe has been lined, a start liner is applied to a main pipe in order to line the main pipe.

2. Description of the Prior Art

A method for repairing pipes is known in which, when an underground sewer pipe or other pipe has degraded over time, the pipe is not extracted from the ground, but, instead, a lining is applied to an inner peripheral surface of the pipe to be repaired.

In this method, a pipe lining material is obtained by impregnating a tubular non-woven cloth, whose outer peripheral surface is covered by a highly airtight film, with a curable resin. The tubular pipe lining material is inserted into the pipe while being everted by fluid pressure, and then pressed against the inner peripheral surface of the pipe. The curable resin impregnated in the pipe lining material is then heated and cured to provide the lining for the pipe to be repaired.

A plurality of lateral pipes is connected to the sewer pipe or other pipe (main pipe), and a lining is applied to these lateral pipes by the same method described above. In other words, a lateral pipe lining material composed of a tubular resin absorbing material that has a cured flange on one end, that has an outer surface covered by a highly airtight plastic film, and that is impregnated with an uncured curable resin is guided into the main pipe. The lateral pipe lining material is everted and inserted into the lateral pipe via fluid pressure from the main pipe side toward the ground level in a state in which the flange of the lateral pipe lining material is brought into contact with a peripheral edge of a lateral pipe opening of the main pipe. While the lateral pipe lining material is pressed against an inner wall of the lateral pipe, the curable resin with which the lateral pipe lining material is impregnated is cured to provide the lining for the lateral pipe (Japanese Laid-open Patent Application No. 2000-127241).

Normally, the lateral pipe is lined before lining of the main pipe, and, after the lateral pipe has been lined, the tubular start liner is everted and inserted into the main pipe. The tubular lining material, which is attached to a terminal end of the start liner, is then inserted inside the start liner (Japanese Laid-open Patent Application No. 1996-216256). The start liner mainly prevents ground water and sewage from leaking into the main pipe while the main pipe is being lined, and is used in order to ensure and facilitate the process of lining the main pipe.

In the prior art, after a lateral pipe has been lined, a flange of a lateral pipe lining material is cured and mounted in contact with the peripheral edge of a lateral pipe opening of a main pipe. Therefore, a problem will arise in that, when the main pipe is lined after a start liner has been applied, the bond between the main pipe lining material and the flange of the lateral pipe lining material will be adversely affected by the start liner, the main pipe lining material and the lateral pipe lining material will not be properly joined, water will leak into the pipe from the inadequately connected portion, and defects will occur in the lining.

It is therefore an object of the present invention to provide a pipe lining method in which a lateral pipe lining material and a main pipe lining material can be reliably bonded when a main pipe is lined with a start liner applied thereto after lining of the lateral pipe.

SUMMARY OF THE INVENTION

The present invention provides pipe lining method in which a lateral pipe that intersects with a main pipe is lined before lining of the main pipe. The method comprises the steps of lining the lateral pipe using a lateral pipe lining material having a flange at one end, which is brought into contact with the peripheral edge of a lateral pipe opening of the main pipe; mounting melting means to the flange of the lateral pipe lining material during or after lining of the lateral pipe; inserting a tubular start liner into the main pipe past the lateral pipe opening; inserting a tubular main pipe lining material impregnated with a curable resin into the start liner past the lateral pipe opening; applying a fluid pressure inside the main pipe to bring the main pipe lining material and the start liner into contact with an inner peripheral wall of the main pipe and the flange of the lateral pipe lining material; curing the resin in the main pipe lining material to line the main pipe; and activating, during lining of the main pipe, the melting means to melt the start liner, thereby integrating the main pipe lining material and the flange of the lateral pipe lining material.

Alternatively, the melting means is mounted in advance to a surface of the flange of the lateral pipe lining material that faces the center axis of the main pipe rather than while the lateral pipe is being lined or after the pipe has been lined.

In the present invention, while the main pipe is being lined, the melting means is activated to melt the start liner existing between the main pipe lining material and the flange of the lateral pipe lining material. The curable resin with which the main pipe lining material is impregnated will be cured, allowing the main pipe lining material and the flange of the lateral pipe lining material to be integrated.

Further features of the invention, its nature and various advantages will be more apparent from the accompanying drawings and following detailed description of the invention.

DESCRIPTION OF THE PREFERRED EMBODIMENTS

The present invention will now be described in detail with reference to the embodiments shown in the drawings.

Figure 1:
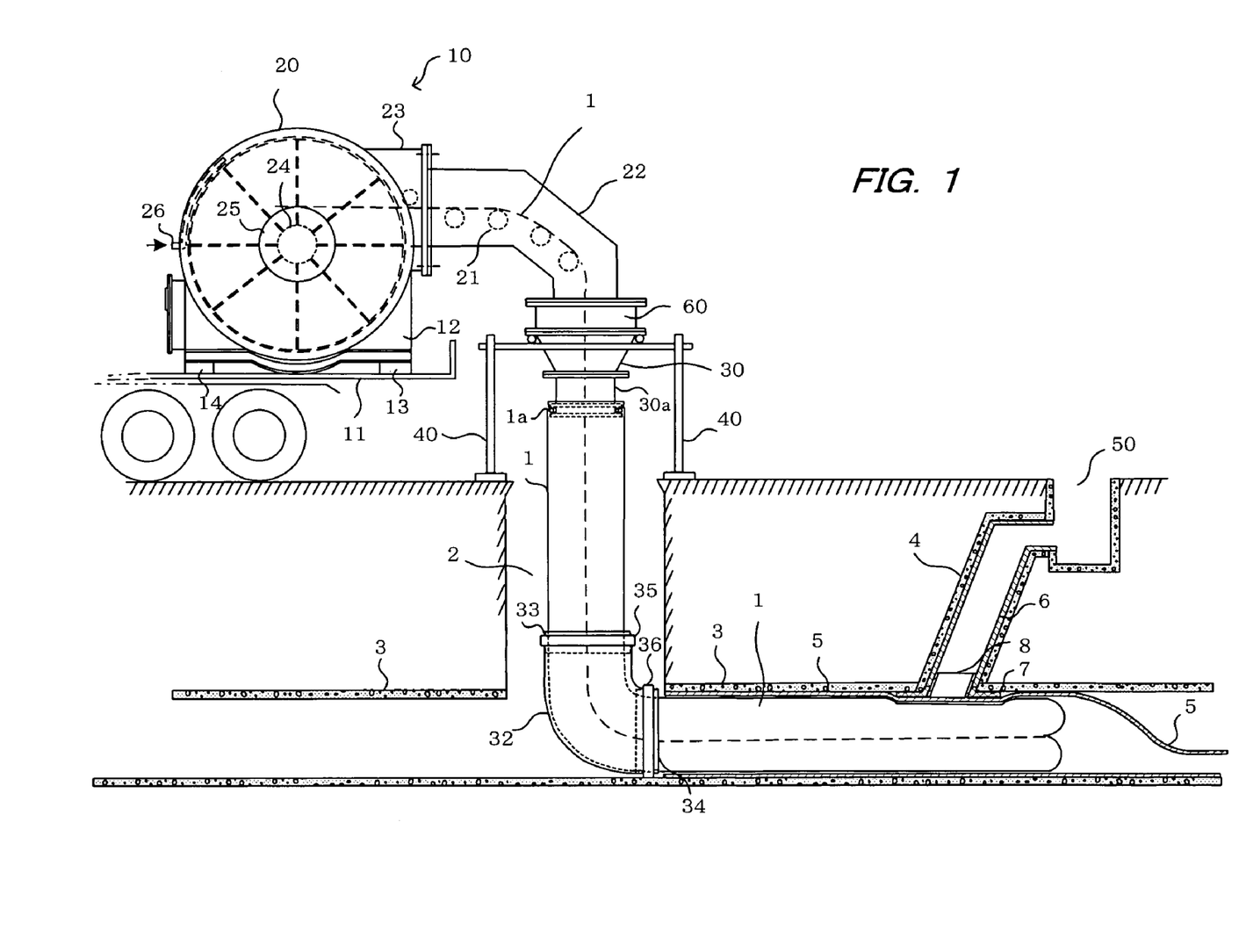
FIG. 1 is an illustrative view showing a state in which a main pipe lining material is everted and inserted into a main pipe from a manhole.
Figure 2:
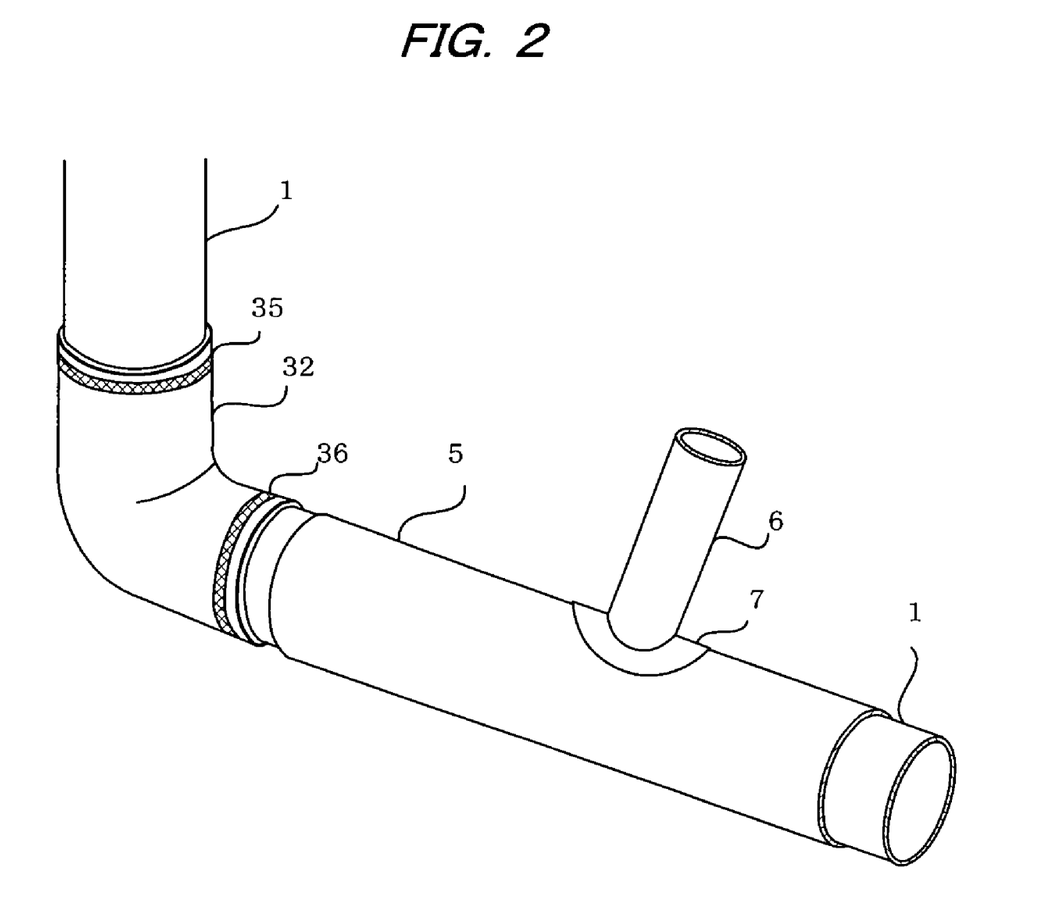
FIG. 2 is a perspective view showing an everted and inserted start liner and main pipe lining material.

FIG. 1 show an everting apparatus 10 for everting a main pipe lining material 1 for lining a sewer pipe or other main pipe 3 and a start liner 5. The everting apparatus 10 is mounted on a load platform of a truck 11 via a support plate 12 and upper and lower regulatory mechanisms 13, 14, and is transported to a construction site having a manhole 2. The everting apparatus 10 has a receptacle 20 having an airtight closed structure for accommodating the start liner 5 and the main pipe lining material 1, which is connected to a terminal end of the start liner. A mounting pipe 60 is detachably mounted to the receptacle 20 via a guide part 22 having a plurality of guide rollers 21. A cylindrical eversion nozzle 30 having an opening 30a formed at a distal end is detachably mounted to the mounting pipe 60 so as to face the manhole 2.

A heating medium supplying hose, a heating medium discharging hose, an air supplying hose for supplying compressed air, and a mounting hole to which an air discharge hose for discharging air is mounted are formed on a side part of the mounting pipe 60. When the main pipe lining material 1 has been completely everted and inserted into the main pipe 3, the mounting pipe 60 and receptacle 20 (the guide part 22 and a portion of the receptacle 20) are separated, and a pressure lid 72 (FIG. 5) is then mounted on an upper part of the mounting pipe 60 in an airtight fashion.

A guide tube 32 composed of a cloth or the like for bending the main pipe lining material 1 and for guiding the lining material into the main pipe 3 is disposed below the eversion nozzle 30 in the manhole 2. A manhole-side end part and main pipe-side end part of the guide tube 32 are each anchored to mounting pipes 33, 34 by mechanical metallic bands 35, 36, respectively. Being made from a cloth, the guide tube 32 can therefore be bent, inserted from the manhole 2 in an uncomplicated manner, and disposed at a bottom part of the manhole.

The eversion nozzle 30, mounting pipe 60, guide part 22, and receptacle 20 have an entirely airtight closed structure except for where the nozzle opening 30a is formed.

A bearing part 25 for rotatably receiving a reel 24 is mounted on both sides of the receptacle 20. The reel 24 is used to wind the start liner 5 and the main pipe lining material 1, which is connected to the terminal end part of the start liner, into the shape of a roll using an electric motor (not shown). As shall be described below, when the start liner 5 and main pipe lining material 1 that are wound around the reel 24 are to be drawn from the receptacle 20, a torque acting upon the reel 24 will cause the reel 24 to rotate in a reverse direction, the electric motor will be caused to rotate and act as a power generator, and braking will be produced in drawing out the materials.

A duct 26 for conveying fluid pressure (compressed air) for everting the start liner 5 and pipe lining material 1 to the receptacle 20 is mounted on the receptacle 20.

The start liner 5 that has been wound around the reel 24 is a well-known tubular start liner, and is a woven or nonwoven cloth made of polyester, Nylon, acrylic, or another such material that is formed into a tubular shape, covered on an outer surface by a highly airtight plastic film made of polyethylene, vinyl chloride, or another substance. The start liner 5 is configured to have a thickness of 0.1 m/m to 15 m/m. The start liner is alternatively formed into a tubular shape using only a plastic film.

The main pipe lining material 1 is also a well-known tubular pipe lining material composed of a tubular resin absorbing material that has been covered in an airtight fashion on an outer surface by a plastic film and that has been impregnated with an uncured liquid-form curable resin. Polyethylene, vinyl chloride, vinylon, polyurethane, nylon, polypropylene, polyethylene-nylon copolymer, or another film is used for the plastic film; and a nonwoven cloth composed of polyester, nylon, acrylic, vinylon, or another material is used for the tubular resin absorbing material. Unsaturated polyester resin, epoxy resin, or another thermosetting resin is used for the liquid curable resin impregnated into the tubular resin absorbing material.

Normally, when the main pipe 3 and lateral pipe 4 intersect, the pipes are lined starting with the lateral pipe 4. In lining the lateral pipe, the lateral pipe lining material 6 that has the cured flange 7 at one end and is composed of a tubular resin absorbing material covered on an outer surface by a highly airtight plastic film and impregnated with an uncured curable resin is inserted into the main pipe 3 using a robot or the like. The lateral pipe lining material 6 is everted and inserted into the lateral pipe 4 from the main pipe side toward a ground-level box 50 by fluid pressure in a state in which the flange 7 of the lateral pipe lining material 6 is brought into contact with the peripheral edge of the lateral pipe opening of the main pipe 3. The lateral pipe lining material 6 is pressed against the inner wall of the lateral pipe, and the curable resin therein is cured so as to line the lateral pipe. As shall be described below, a metallic collar 8 for preventing the lateral pipe lining material and a drill blade of a drill from coming into contact and causing damage to the lateral pipe lining material is mounted to the main pipe-side end part of the lateral pipe lining material.

Figure 3:
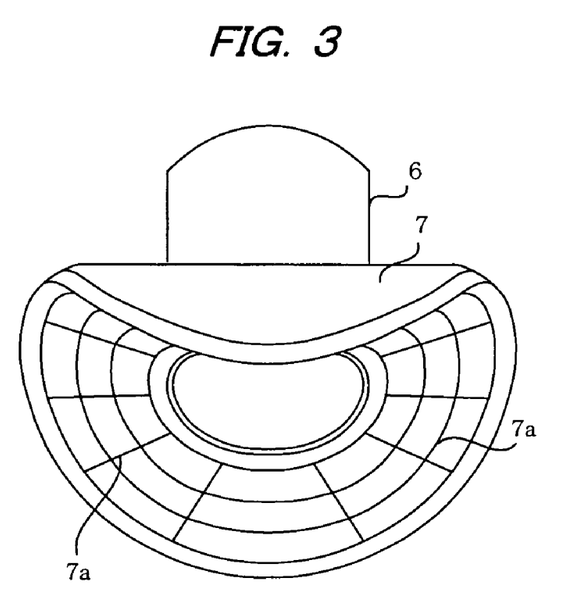
FIG. 3 is a perspective view showing a lateral pipe lining material provided at one end with a flange.
Figure 4:
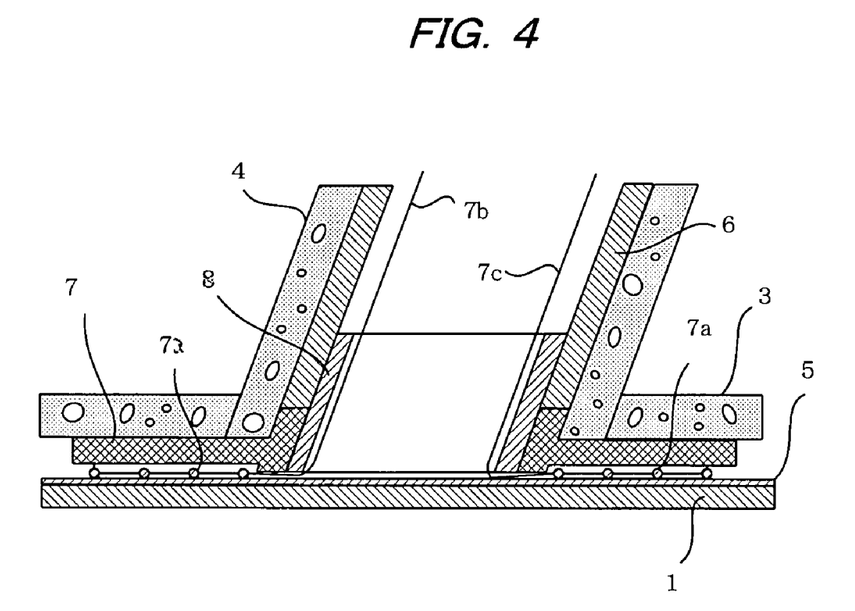
FIG. 4 is a cross-sectional view of the vicinity of a lateral pipe opening when the main pipe lining material has been inserted.

In the present invention, while the lateral pipe is being lined or after the lateral pipe has been lined, e.g., at the latest, before the start liner 5 has been inserted into the main pipe 3, melting means composed of a heating wire (Nichrome wire) 7a shaped like a net or the like is bonded to a surface of the flange 7 of the lateral pipe lining material 6 that faces the center axis of the main pipe 3, as shown in FIGS. 3 and 4. Lead wires 7b, 7c guided toward ground level are connected to the heating wire 7a. Electricity is provided to the heating wire 7a via the lead wires 7b and 7c to heat the heating wire 7a and melt the start liner 5 that is in contact therewith. When the start liner 5 melts, a portion of the heating wire 7a melts. This causes the heating wire 7a to be disconnected and no electricity to be supplied any longer. The heating wire or other melting means is omitted from FIGS. 1 through 5 in order to avoid making the drawings complicated.

The lining processes are as follows: as shown in FIG. 1, the everting apparatus 10 with the eversion nozzle 30 mounted to the mounting pipe 60 is moved so that the nozzle opening 30a of the eversion nozzle 30 is oriented toward the manhole 2.

The guide tube 32 is then inserted from the manhole 2 and positioned at a bottom part of the manhole. A distal end of the start liner 5 wound around the reel 24 of the receptacle 20 is guided to the nozzle opening 30a of the eversion nozzle 30, folded back toward the outside, and mounted in an airtight fashion to an outer periphery of the nozzle opening 30a. Compressed air is then fed into the receptacle 20 via the duct 26, whereby the start liner 5 is rewound from the reel 24, pulled from the receptacle 20, guided by the guide tube 32, and everted and inserted into the main pipe. At this time, the electric motor acts as a power generator and provides a braking for the pulling of the start liner 5. The start liner 5 inserted into the main pipe 3 covers the interior thereof, preventing ground water and sewage from leaking into the main pipe 3.

Once the start liner 5 has been applied to the main pipe 3, the main pipe lining material 1 that is connected to the terminal end of the start liner 5 and that is wound around the reel 24 is pulled from the receptacle 20, and, in the same manner as with the start liner 5, a distal end 1a of the main pipe lining material 1 is guided to the nozzle opening 30a of the eversion nozzle 30, folded back toward the outside, and mounted in an airtight fashion to the outer periphery of the nozzle opening 30a. When compressed air is provided into the receptacle 20 via the duct 26, the main pipe lining material 1 is pulled out from the receptacle 20, guided by the guide tube 32, and inserted while being everted into the start liner 5 already inserted into the main pipe 3. This state is shown in FIG. 1 and is shown as a perspective view in FIG. 2.

Figure 5:
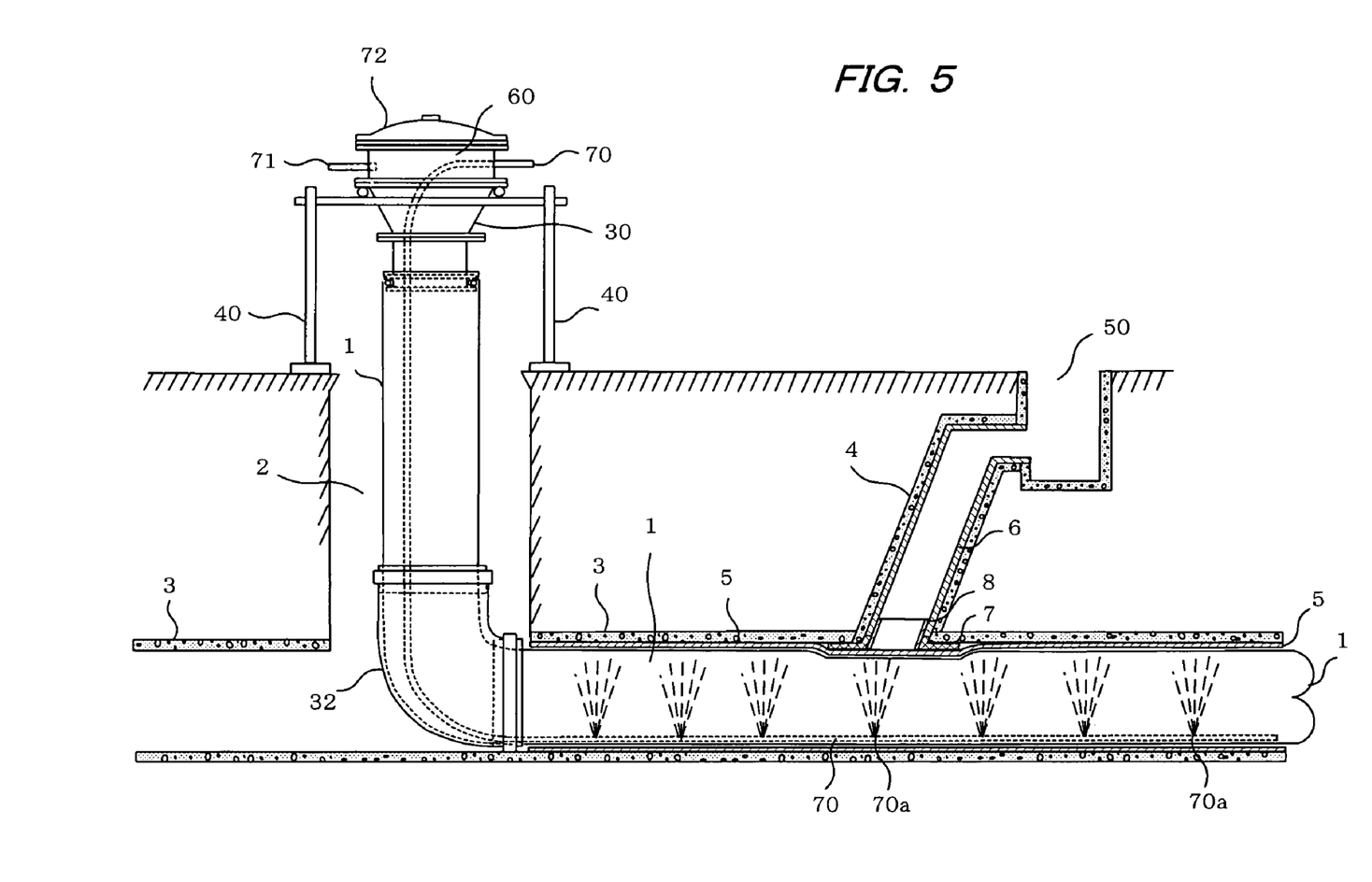
FIG. 5 is an illustrative view showing a state in which the main pipe lining material is cured.

Once the main pipe lining material 1 has been everted and inserted into the main pipe 3 a predetermined length past a location where the main pipe intersects with the lateral pipe 4, the mounting pipe 60 and receptacle 20 are detached. After an upper part of the mounting pipe 60 has been closed off by the pressure lid 72, as shown in FIG. 5, the air supply hose 71 is mounted to a side part of the mounting pipe 60, and compressed air is fed into the everted main pipe lining material 1. A state is thereby created in which the start liner 5 and pipe lining material 1 are expanded and pressed against an inner wall surface of the main pipe 3. A steam or hot water hose 70 is then inserted into the main pipe lining material 1 from the side part of the mounting pipe 60, steam or hot water is discharged in a mist form from a plurality of discharge openings 70 provided on the hose 70, and the curable resin impregnated into the main pipe lining material 1 is cured.

When the resin of the main pipe lining material 1 is heated for curing, electricity is provided to the heating wire 7a via the lead wires 7b, 7c, the heating wire 7a is heated, and the start liner 5 that is in contact with the heating wire 7a is melted, as shown in FIG. 4. When the start liner 5 melts, a portion of the curable resin in the main pipe lining material 1 is penetrated from the melted start liner 5 and comes into contact with and affixed to the flange 7 of the lateral pipe lining material 6. Therefore, curing the resin of the main pipe lining material 1 causes the main pipe lining material 1 and flange 7 of the lateral pipe lining material 6 to become integrated, thereby reliably joining the main pipe lining material 1 and the lateral pipe lining material 6.

When the heating wire 7a is not disconnected and continues to generate heat, a risk is presented of causing damage to the main pipe lining material. Therefore, the power source is switched off by a switch or the like once a predetermined amount of time has passed since power was supplied to the heating wire.

The same effect can be obtained when, instead of using the heating wire 7a, a solvent capable of dissolving the start liner 5 is applied to the surface of the flange 7 that faces the center part of the main pipe.

The heating wire, solvent, or other melting means is mounted during or after the lateral pipe lining process in the above-mentioned embodiment, but may instead be mounted or applied to the surface of the flange 7 in advance when the lateral pipe lining material is manufactured or before the lateral pipe is lined.

Figure 6:
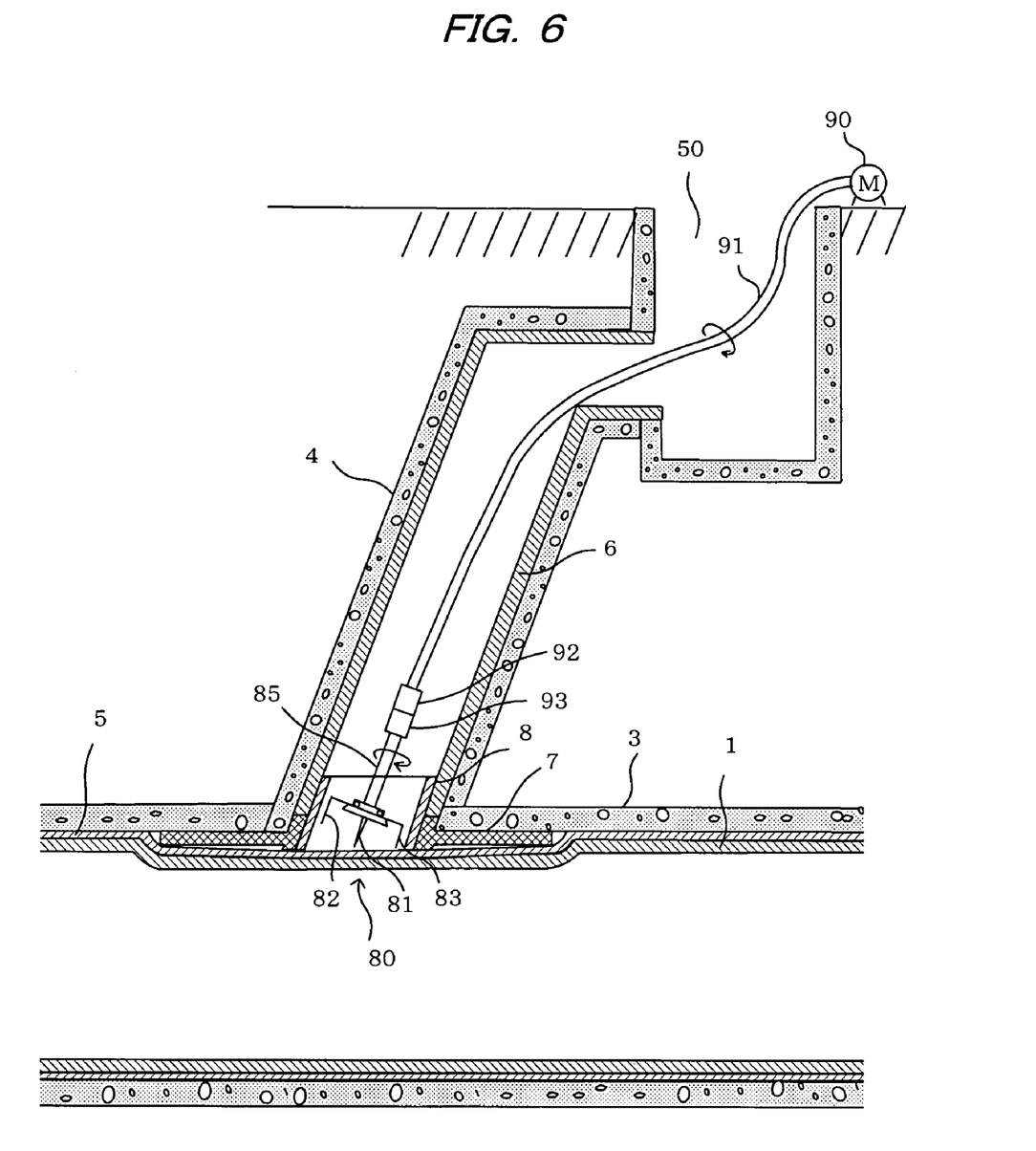
FIG. 6 is an illustrative view showing a state in which a hole has been drilled in the start liner and main pipe lining material that close off the lateral pipe opening.

As described above, once the main pipe lining material 1 has been cured and the main pipe 3 has been lined, the drill 80 is inserted into the lateral pipe 4 from the box 50 and is used to drill a hole in the start liner 5 and main pipe lining material 1 that close off the lateral pipe opening, as shown in FIG. 6.

Figure 7A:
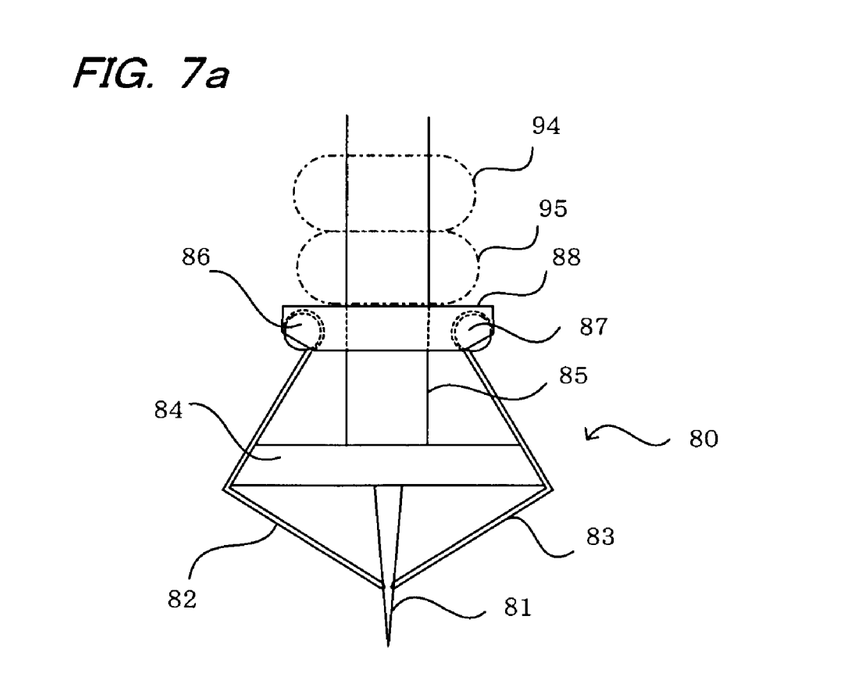
FIG. 7a is a front view showing when drill blades of a drill are retracted.
Figure 7B:
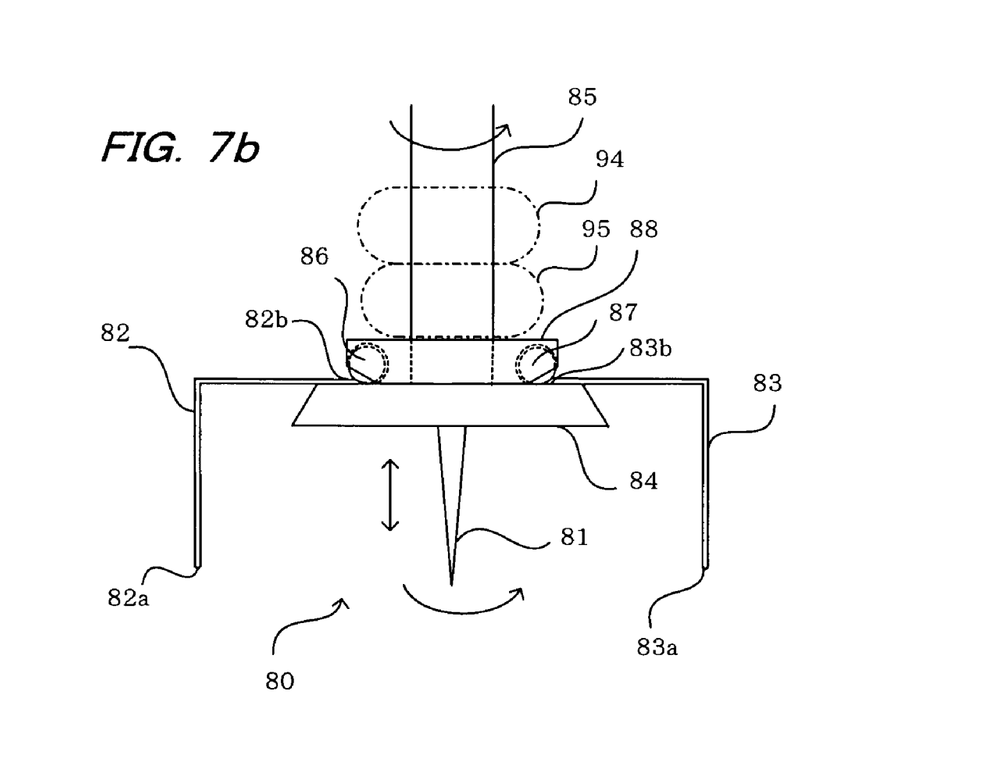
FIG. 7b is a plan view when the drill blades are deployed.
Figure 8:
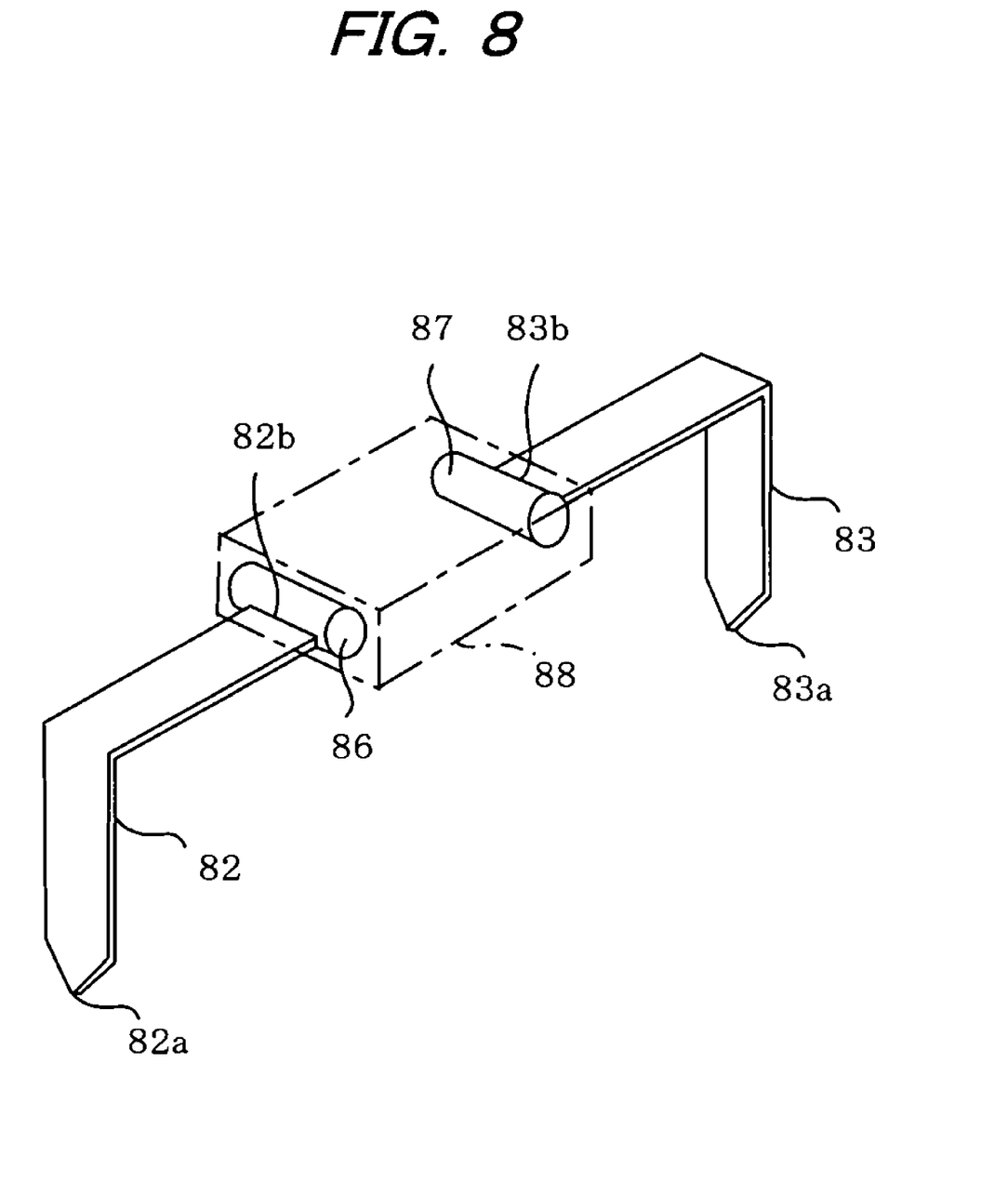
FIG. 8 is a perspective view of the drill blade.

The drill 80 has a distal end drill 81 and drill blades 82, 83 that are respectively bent to substantially 90° angles, as shown in FIGS. 7a and 7b. The distal end drill 81 is anchored to a rotary table 84 that is attached to a rotation shaft 85. End parts 82b, 83b of the drill blades 82, 83 on sides opposite blade edges 82a, 83a of the drill blades are mounted to columnar rotation rods 86, 87 (FIG. 8). The rotation rods 86, 87 are able to rotate between positions shown in FIGS. 7a and 7b about a line perpendicular to the page space in a space formed in a support box 88, and, in a normal state, are urged by a spring (not shown) so that the rotation rods 86, 87 reach the orientation shown in FIG. 7a. The rotation shaft 85 and support box 88 can both slide in an axial direction. When the rotation shaft 85 rotates, the support box 88 also rotates about an axial center of the rotation shaft 85.

The rotation shaft 85 of the drill 80 is connected to a ground-level motor 90 via a flexible shaft 91 and joints 92, 93, and is rotated by driving the motor 90. The rotation shaft 85 is slid relative to the support box 88 by fixing the support box 88 in place and pulling the flexible shaft 91 toward ground level, and can be moved upward.

The drill 80 is guided up to the lateral pipe opening in a state in which the blade drills 82, 83 are retracted, as shown in FIG. 7a. At this time, weights 94, 95 indicated by the imaginary lines place weight on the support box 88 to guide the drill.

When the drill 80 has been inserted to a distance near the lateral pipe opening to drill a hole in the start liner 5 and main pipe lining material 1, the support box 88 is anchored to the lateral pipe 4 by hand or another suitable anchoring means and the flexible shaft 91 is pulled toward the box 50. This causes the rotation shaft 85 to be slid in the axial direction toward the support box 88 and the rotary plate 84 to be lifted until contact is made with the support box 88. The upward movement of the rotary plate 84 causes the drill blades 82, 83 to also move upward as shown in FIG. 7b, whereby the blade edges 82a, 83a of the drill blades 82, 83 are oriented toward the start liner 5 and main pipe lining material 1 that close off the lateral pipe opening. In this state, the rotary plate 84 and support box 88 are locked by a locking means (not shown), and the drill blades 82, 83 are held in the state shown in FIG. 7b.

When the motor 90 is driven, the rotation shaft 85 rotates, the distal end blade 81 rotates, and the support box 88 also rotates, whereby the drill blades 82, 83 are rotated about the rotation shaft 85. In this state, the entire body of the drill is further moved toward the main pipe. This allows a hole to be drilled in the start liner 5 and main pipe lining material 1 that close off the lateral pipe opening.

Once the lateral pipe opening has been drilled open, the distal end of the main pipe lining material 1 protruding from the main pipe is cut, and the pipe lining process is complete.

The drill blade of the drill 80 is composed of a pair of drill blades disposed so as to be set apart 180° from each other when viewed from above. However, the drill blades may be composed of four drill blades disposed so as to be set apart by 90°.

In the above-described example, the start liner 5 and main pipe lining material 1 were everted and inserted into the main pipe 3. However, the present invention can be applied to a pipe lining process in which the start liner and main pipe lining material are drawn and inserted into the main pipe without being everted.

What is claimed is:

1. A pipe lining method in which a lateral pipe that intersects with a main pipe is lined before lining of the main pipe, comprising the steps of:

lining the lateral pipe using a lateral pipe lining material having a flange at one end, which is brought into contact with the peripheral edge of a lateral pipe opening of the main pipe;

mounting melting means to the flange of the lateral pipe lining material during or after lining of the lateral pipe;

inserting a tubular start liner into the main pipe past the lateral pipe opening;

inserting a tubular main pipe lining material impregnated with a curable resin into the start liner past the lateral pipe opening;

applying a fluid pressure inside the main pipe to bring the main pipe lining material and the start liner into contact with an inner peripheral wall of the main pipe and the flange of the lateral pipe lining material;

curing the resin in the main pipe lining material to line the main pipe; and activating, during lining of the main pipe, the melting means to melt the start liner, thereby integrating the main pipe lining material and the flange of the lateral pipe lining material.

2. A pipe lining method according to claim 1, wherein the melting means is a reticulated wire that is bonded to the surface of the flange that faces the axial center of the main pipe.

3. A pipe lining method according to claim 1, wherein the melting means is a solvent capable of dissolving the start liner bonded to the surface of the flange that faces the axial center of the main pipe.

4. A pipe lining method according to claim 1, wherein the start liner and main pipe lining material are mounted on an eversion nozzle and evertedly inserted into the main pipe.

5. A pipe lining method according to claim 1, wherein, after the main pipe has been lined, a drill is inserted into the lateral pipe toward the main pipe, and a hole is drilled into the start liner and main pipe lining material that close off the lateral pipe opening.

6. A pipe lining method according to claim 5, wherein the drill has a drill blade that is retracted until inserted in the lateral pipe opening and that expands toward the start liner and main pipe lining material when inserted up to the lateral pipe opening.

7. A pipe lining method according to claim 5, wherein a metallic collar for preventing contact between the drill blade and lateral pipe lining material is disposed in a portion of the lateral pipe lining material where the drill blade is deployed.

8. A pipe lining method in which a lateral pipe that intersects with a main pipe is lined before lining of the main pipe, comprising the steps of:

lining the lateral pipe using a lateral pipe lining material having a flange at one end and melting means mounted thereon, the flange of the lateral pipe lining material being brought into contact with the peripheral edge of a lateral pipe opening of the main pipe;

inserting a tubular start liner into the main pipe past the lateral pipe opening;

inserting a tubular main pipe lining material impregnated with a curable resin into the start liner past the lateral pipe opening;

applying a fluid pressure inside the main pipe to bring the main pipe lining material and the start liner into contact with an inner peripheral wall of the main pipe and the flange of the lateral pipe lining material;

curing the resin in the main pipe lining material to line the main pipe; and activating, during lining of the main pipe, the melting means to melt the start liner, thereby integrating the main pipe lining material and the flange of the lateral pipe lining material.

9. A pipe lining method according to claim 8, wherein the melting means is a reticulated wire that is bonded to the surface of the flange that faces the axial center of the main pipe.

10. A pipe lining method according to claim 8, wherein the melting means is a solvent capable of dissolving the start liner bonded to the surface of the flange that faces the axial center of the main pipe.

11. A pipe lining method according to claim 8, wherein the start liner and main pipe lining material are mounted on an eversion nozzle and evertedly inserted into the main pipe.

12. A pipe lining method according to claim 8, wherein, after the main pipe has been lined, a drill is inserted into the lateral pipe toward the main pipe, and a hole is drilled into the start liner and main pipe lining material that close off the lateral pipe opening.

13. A pipe lining method according to claim 12, wherein the drill has a drill blade that is retracted until inserted in the lateral pipe opening and that expands toward the start liner and main pipe lining material when inserted up to the lateral pipe opening.

14. A pipe lining method according to claim 12, wherein a metallic collar for preventing contact between the drill blade and lateral pipe lining material is disposed in a portion of the lateral pipe lining material where the drill blade is deployed.

* * * * *